United States Patent [19]

Schimke

[11] Patent Number: 4,911,090
[45] Date of Patent: Mar. 27, 1990

[54] SEED BOOT

[76] Inventor: Harvey Schimke, 4630-61st Street, Red Deer, Alberta, Canada, T4N 2R2

[21] Appl. No.: 231,816

[22] Filed: Aug. 12, 1988

[51] Int. Cl.⁴ .............................................. A01L 7/20
[52] U.S. Cl. ..................................... 111/150; 111/152
[58] Field of Search .................. 111/7, 34, 84, 85, 87, 111/86, 73, 80

[56] References Cited

U.S. PATENT DOCUMENTS

| | | | |
|---|---|---|---|
| 1,564,083 | 12/1975 | Lyons | 111/86 |
| 4,373,455 | 2/1983 | Friggstad | 111/86 |
| 4,633,791 | 1/1987 | Lindstrom et al. | 111/86 |
| 4,638,748 | 1/1987 | Koecky | 111/73 |
| 4,669,922 | 6/1987 | Hooper et al. | 111/86 |
| 4,721,047 | 1/1988 | Stauch | 111/73 |
| 4,726,304 | 2/1988 | Dreyer et al. | 111/73 |

FOREIGN PATENT DOCUMENTS

| | | | |
|---|---|---|---|
| 39594 | 6/1909 | Austria | 111/86 |
| 1091101 | 12/1980 | Canada | 111/86 |
| 2074432 | 11/1981 | United Kingdom | 111/7 |

Primary Examiner—Danton D. DeMille
Attorney, Agent, or Firm—Irell & Manella

[57] ABSTRACT

A seed boot for air seeders includes a cast hollow body having a relatively narrow cylindrical upper end intake into which a seed tube may be clamped. Vertically spaced apart transverse ribs or steps are situated one on the front wall and one on the rear wall of the interior of the body to equal distribution of the seed regardless of the angle at which the tube enters the boot. Spreaders may be secured to the bottom or discharge end of the boot and can be used to adjust the spread pattern of the seed and an air release slot or vent is provided in the rear wall of the body to reduce air pressure thus reducing the speed at which the seed strikes the ground thereby reducing bounce. A rear strut may be provided at the rear of the boot to accommodate a banding knife if desired, to permit seeding and fertilizer banding in one operation.

19 Claims, 4 Drawing Sheets

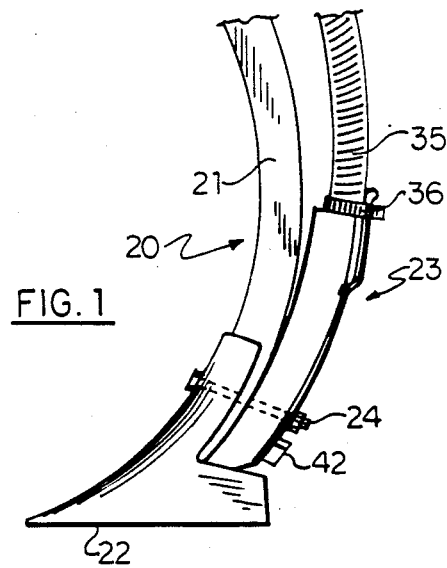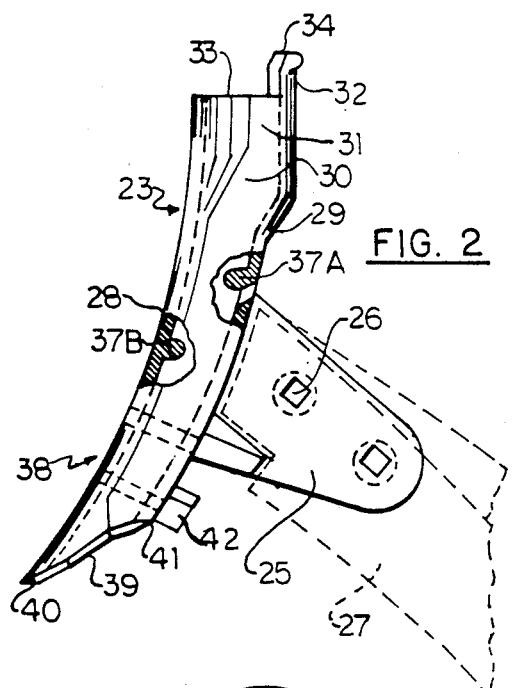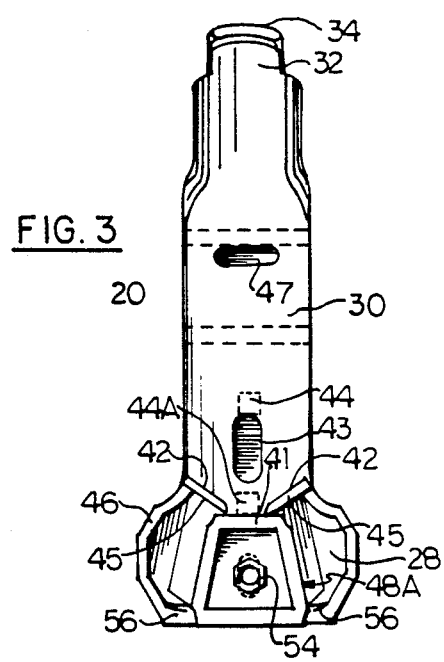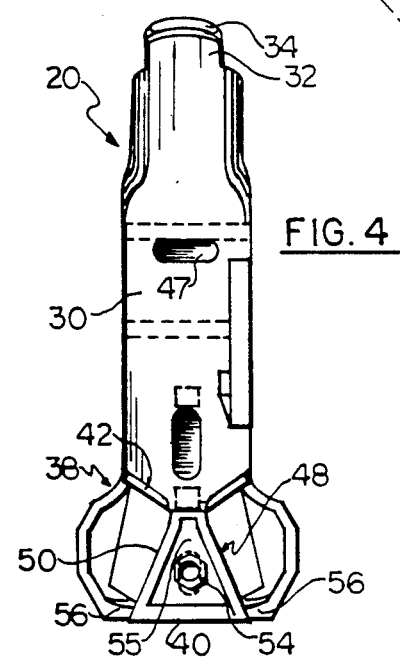

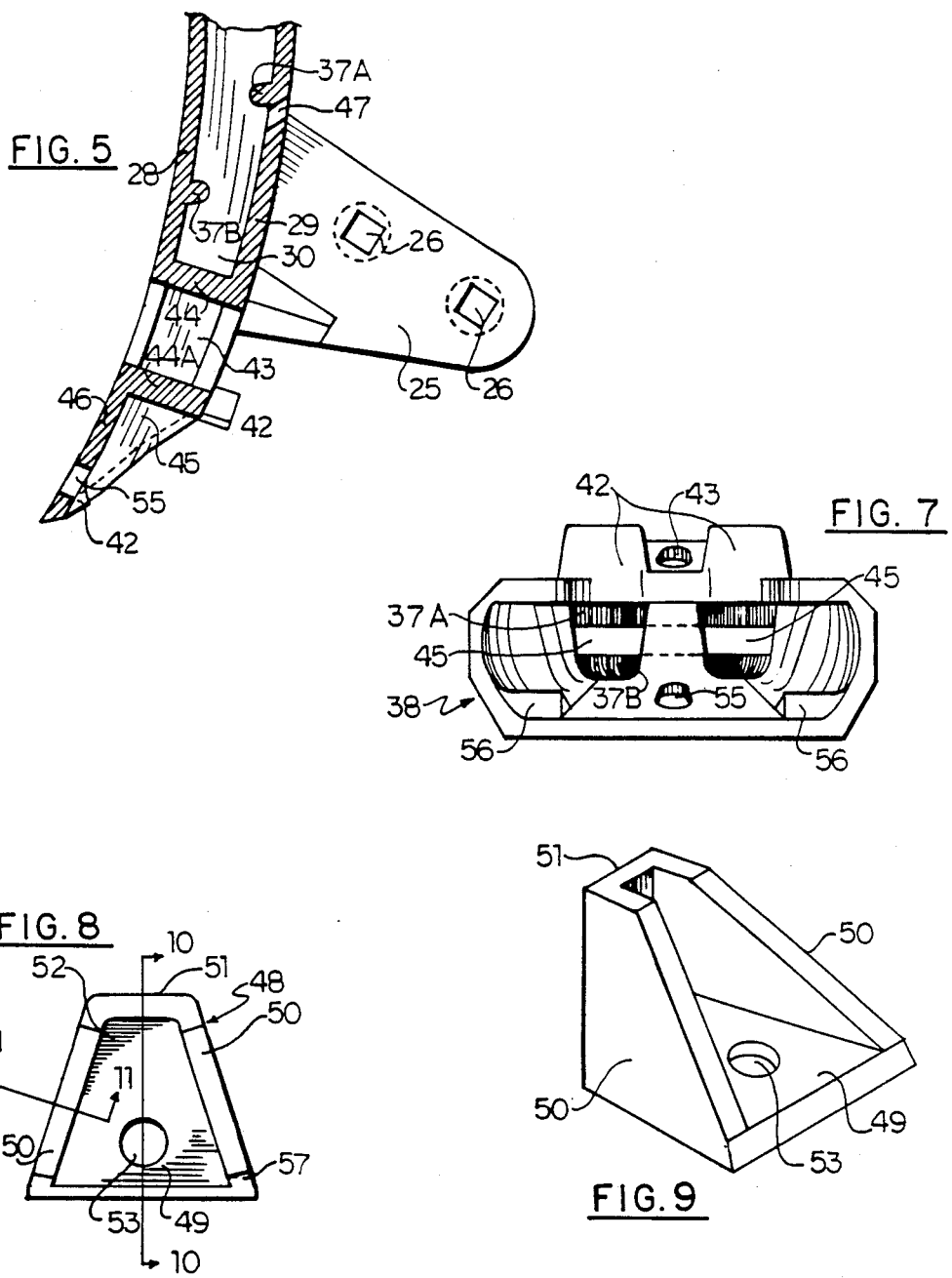

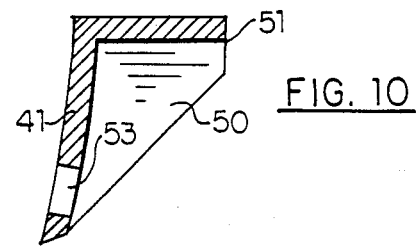
FIG. 10
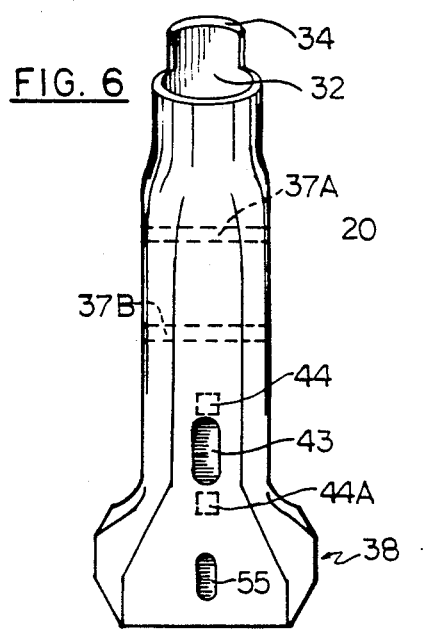
FIG. 6
FIG. 11
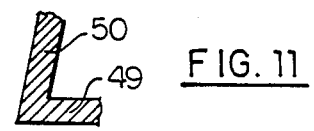
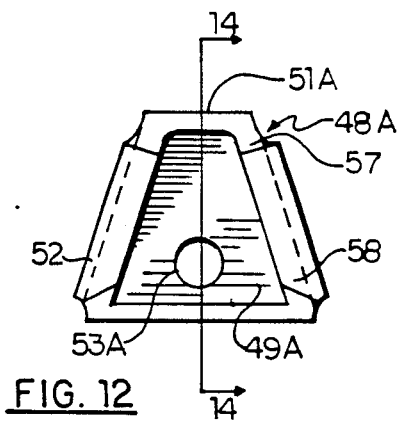
FIG. 12
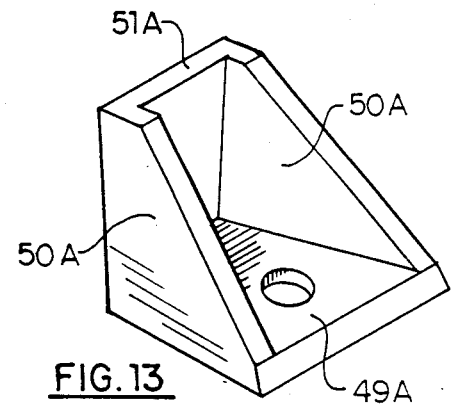
FIG. 13

SEED BOOT

BACKGROUND OF THE INVENTION

This invention relates to new and useful improvements in seed boots designed specifically for use with air seeders or gravity flow mounted seed boxes, which normally include a tool shank with a shovel or a furrow opener secured thereto and a seed boot therebehind with flexible tubes conveying seed to the individual seed boots under air pressure or gravity flow.

Conventional boots suffer from several disadvantages. Firstly, it is difficult t ensure that the flexible tube enters the upper end of the seed boot in alignment with the longitudinal axis thereof as these often twist sideways or rearwardly and forwardly thus upsetting the distribution of the seed passing through the seed boot to the discharge aperture or apertures at the lower end thereof.

Secondly, it is difficult to adjust the spread pattern of the seed exiting from the individual seed boots. Furthermore it will be appreciated that this pattern varies with the size and quantity of seed so that it is desirable and more economic to be able to adjust the spread pattern within limits.

Seed bounce can be a serious problem particularly when the ground is relatively hard and this of course upsets the distribution pattern and often results in seed being spread outside of the furrow where it is normally wasted.

The present device may include an air vent through the body portion which not only reduces the air pressure and thus reduces the bounce of seed striking the ground but also acts as an escape for seed if the lower end of the seed boot becomes plugged with mud or trash so that at least some of the seed may get planted in the furrows in which the seed boot has become plugged. The lower front wall of the seed boot is flared outwardly and rearwardly to form a shroud for the seed distribution apertures and also to allow the attachment of spreaders, if desired.

A rear strut may be provided on the rear wall of the seed boot to accommodate a knife assembly thus allowing seeding and fertilizer banding to be performed in one operation.

In accordance with the invention there is provided a seed boot for attachment to a shank and shovel assembly of ground opener comprising in combination a hollow body portion including a front wall, a rear wall, and side walls, a substantially cylindrical seed tube connector at the upper end of the body, and a seed discharge formed at the lower end of said bodY portion, said seed discharge including said front wall extending below the lower end of said rear wall and flaring outwardly and rearwardly upon each side of the longitudinal axis of said front wall, means within said seed discharge to divide same into a pair of side by side discharge openings, at least one deflector step situated within said body portion on one of said front and rear walls to equalize distribution of seed passing there through regardless of the angle of entry of said seed tube attached to said boot and at least one air vent formed through the wall of said boot.

Another advantage of the invention is that the seed boot is preferably cast from malleable cast iron although it may be manufacture from welded steel, plastics or the like.

Another advantage of the invention is to provide a device of the character herewithin described which is simple in construction, economical in manufacture and otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevation of the preferred embodiment shown attached to a shank and shovel assembly.

FIG. 2 is a view of the seed boot of FIG. 1 but with the banding knife strut formed therewith.

FIG. 3 is a rear view of the seed boot of FIG. 1 and showing a relatively large spreader installed thereon.

FIG. 4 is a rear elevation of the seed boot of FIG. 2 and showing a relatively narrow spreader installed thereon.

FIG. 5 is a fragmentary cross-sectional view of the lower end of the seed boot of FIG. 2.

FIG. 6 is a front elevation of the seed boot of FIGS. 1 and 2.

FIG. 7 is an under side plan view of the seed boot.

FIG. 8 is a front elevation of the relatively narrow spreader per se.

FIG. 9 is an isometric view of FIG. 8.

FIG. 10 is a section along the line 10—10 of FIG. 8.

FIG. 11 is a fragmentary section substantially along the line 11—11 of FIG. 8.

FIG. 12 is a front elevation of the relatively large spreader per se.

FIG. 13 is an isometric view of FIG. 12.

In the drawings like characters of reference indicate corresponding parts in the different figures.

DETAILED DESCRIPTION

Figure 14:
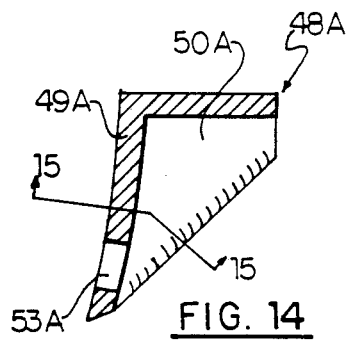
FIG. 14 is a section substantially along the line 14—14 of FIG. 12.

Proceeding to describe the invention in detail, reference should first be made to FIG. 1 which shows in side elevation, a shank and shovel assembly collectively designated 20 and including the side view of the lower end portion 21 of a shank to which a conventional shovel or furrow opener 22 may be secured.

The invention collectively designated 23 is secured to the rear of the lower ed of the shank 21 by means of a nut and bolt assembly 24 and although this nut and bolt assembly is also shown securing the furrow opener to the front of the shank, nevertheless it will be appreciated that separate attachments can be provided for the furrow opener and for the seed boot 23 of the invention to the shank.

FIG. 2 also shows a seed boot collectively designated 23 but having a bracket in the form of plate 25 secured to and extending rearwardly from one side of the boot and being apertured as at 26 to receive a banding knife shown in phantom by reference character 27 which extends rearwardly and downwardly and which will normally have a fertilizer tube secured thereto and conveying granular or liquid fertilizer or NH₃, downwardly along the upper edge of the knife to the deeper furrow being opened thereby thus allowing side banding of fertilizer to take place as the seeding action is proceeding.

The two seed boots shown in FIGS. 1 and 2 are identical with the exception of the bracket 25 which is an option so that similar reference characters have been given both embodiments.

The seed boot 23 includes a front wall 28, a rear wall 29 and side walls 30 preferably made from malleable cast iron although other methods of manufacture may of course be utilized.

At the upper end is formed a seed tube socket 31 which is cylindrical and which includes a semi-circular rear wall portion 32 extending above the upper end 33 of the seed boot and which is provided with an off-standing flange 34, the purpose of which will hereinafter become apparent. The cross-sectional area of the cylindrical tube receiving portion 31 is preferably less than the cross-sectional area of the main body portion of the boot but may be equal if desired.

A flexible seed and air carrying tube 35 is engaged within the upper end 33 and a clamp 36 extends around the tube and around the semi-circular extension 32 and tightened thus holding the tube against the portion 32 with upward displacement being prevented by the flange 34. The diameter of the tube is normally substantially smaller than the diameter of the upper end 33 and sometimes difficulty is encountered in aligning the discharge end of the tube axially with the body portion and this misalignment may of course upset distribution of the entrained seed being transferred from the air seeder (not illustrated) to the individual seed boots.

For this reason, means are provided to equalize seed distribution as much as possible regardless of the angle of entry of the tube 35 into the seed boot 23.

Reference to FIGS. 2, 3 and 5 will show the provision of deflecting steps 37A and 37B. These consist of transversely extending steps extending from the inner surface of the rear and front walls respectively and extending from side to side between the two side walls 30. These two steps are spaced one above the other with 37A being the uppermost on the rear wall and 37B the lowermost on the front wall. These deflecting steps equalize the distribution of the grain entrained within the air stream thus equalizing the discharge at the lower end of the seed boot which terminates in a seed discharge collectively designated 38. It will be appreciated that a single step or more than two steps may be provided depending upon design parameters.

It will be noted from FIGS. 3 and 4 that the rear wall 30 terminates spaced above the lower end of the front wall 28 and that this lowermost portion of the front wall flares outwardly and rearwardly on each side of the longitudinal centre line of said front wall to form a shroud, the lower edges 39 of which extend diagonally upwardly from the lowermost edge 40 to terminate at the lower edge 41 of the rear wall.

Flat plates or tabs 42 extend outwardly and upwardly from each end of the central portion 41 of the lower edge of the rear wall and these extend perpendicularly to the plane of the rear wall and act as trash guards to alleviate plugging of the discharge area with straw, debris and the like engaged by the front of the shovel as the furrow is being opened. When used with a banding knife they alleviate engagement of straw and the like with the knife.

Vertically situated elongated slots 43 are formed through the front and rear walls just above the lower edge 41 of the rear wall through which the aforementioned nut and bolt assembly 24 may be engaged to attach the boot to the shank and a side view of the boot shows that it curves gradually so that it fits against the rear curve of the shank when installed.

This area through which nut and bolt 24 passes is reinforced by fore and aft struts or bridging pieces 44 cast in place with the boot and extending between the front and rear walls thereof substantially upon the longitudinal axis of the boot with the lowermost one specifically designated 44A being situated just above the lower edge 41 of the rear wall and below the vertical slot 43 and the upper one specifically designated 44 being situated just above the upper end of the elongated slot 43.

Not only do these bridging pieces 44 and 44A act as stiffeners but also as dividers dividing the entrained grain into two streams one upon each side of the longitudinal axis each exiting through discharge openings 45 defined by the sides of tee lowermost bridge 44A and the side portion 46 of the shrouds. These in conjunction with the front and rear walls of the lower end of the housing form substantially rectangular discharge apertures and inasmuch as the deflecting steps 37A and 37B have equalized the distribution of the seed within the air stream, the two discharges 45 carry approximately the same volume of seed through each.

The configuration of the shroud and of the apertures 45 govern the basic distribution of the seed and spread pattern thereof as the seed is ejected into the ground within the furrow opened by the furrow opener 22 and excess bounce of the seed is reduced by the provision of a transverse air vent or slot 47 formed through the rear wall of the boot just below the uppermost sep 37A and this slot inclines downwardly and inwardly from the outer surface at approximately 30° as clearly shown in FIG. 5.

Under certain circumstances and of course depending upon the seed being planted, it may be desirable to change the spread pattern from that pre-determined spread pattern provided and in this regard, reference should be made to FIGS. 8 through 15.

FIGS. 8, 9 and 10 show a relatively narrow spreader component collectively designated 48 and formed from malleable cast iron although other methods of construction may of course be used. It includes a substantially truncated triangular base plate 49 and a pair of substantially triangular side walls 50 extending upwardly one upon each side thereof towards the upper end 51 with a truncated triangular rear plate 52 extending between the rear of the base and the side walls. The side walls incline inwardly approximately 10° from the vertical as shown in FIG. 11 and an aperture 53 is formed within the base adjacent the front end thereof by which it may be attached by means of a bolt 54 through an elongated slot 55 formed on the longitudinal axis of the shroud which extends from the front side of the boot.

A relatively narrow shroud is shown attached to the boot illustrated in FIG. 4. It will be noted that two raised projections 56, are provided one upon each side of the lowermost edge 40 of the front side of the shroud and that the front corners 57 of the spreader engage between these raised projections thus preventing sideways displacement of the spreader once it is positioned thus giving an equal spread pattern to each discharge area defined by the shroud, the front all of the boot and the side walls 50 of the spreader.

FIGS. 12 through 15 show a relatively wide spreader which is shown in position in FIG. 3.

Figure 15:
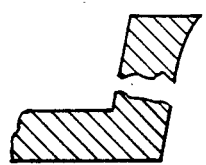
FIG. 15 is a fragmentary section substantially along the line 15—15 of FIG. 14.
Figure 16:
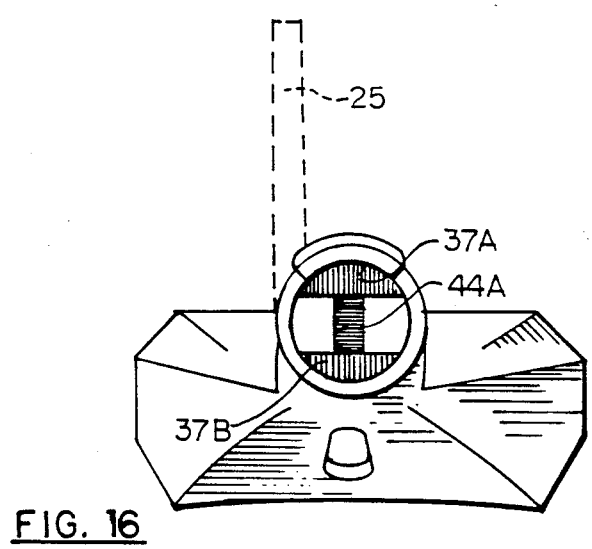
FIG. 16 is a top plan view of the seed boot.

This particular spreader is also provided with a truncated triangular base 49A having the same configuration and dimensions as the base 49 of spreader 48. This spreader 48A includes substantially triangular sides 57 extending upwardly one upon each side of the base but in this case the sides incline upwardly and outwardly approximately 10° thus giving a wider rear wall 51A than the rear wall of spreader 48. Furthermore the upper edges 58 of the side walls flare outwardly in a curve as shown in FIG. 15. This spreader is also bolted through an aperture 53A to the centre of the shroud and gives a different spreader pattern to grain being ejected from the discharge areas 45 of the boot.

Although the relatively narrow spreader is shown in FIG. 4 an the relatively wide spreader in FIG. 3, nevertheless it will be understood that these spreaders can be interchanged and selected as desired depending upon the spread pattern required of the seed, together with the conditions under which the seed is being used.

It will therefore be seen that the seed boot described provides the following advantages.

1. An exhaust air slot or vent which is situated transversely upon the longitudinal axis of the rear wall which not only relieves air pressure to reduce bounce of the seed but also acts as a safety valve should the lower discharge end become plugged.

2. The spread pattern of the seed can be varied within limits by utilizing the seed boot without spreaders, utilizing a relatively narrow spreader with an approximately 10° inboard slope or utilizing a relatively wide spreader with flared sides and an out slope of approximately 10°.

3. Tabs or plates at the rear of the seed boot adjacent the lower end of the rear side preclude clogging with straw, debris or the like which in turn not only prevents clogging of the discharge area but also, when used with a knife, eliminates such debris from engaging the knife.

4. An alternative embodiment utilizes a bracket at the rear so that a banding knife can be secured thereto thereby permitting seeding and side banding to take place concurrently.

5. Seed distribution from side to side is evened out due to the transverse steps which have been cast into the interior passage of the seed boot, either upon one wall or both and one above the other. These deflecting steps ensure that distribution is relatively equal regardless of the angle in which the seed tube or hose enters the upper end of the seed boot.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A seed boot for attachment to a shank and shovel assembly of a ground opener comprising in combination a hollow body portion including a front wall, a rear wall, side walls, a substantially cylindrical seed tube connector at the upper end of the body and having a cross-sectional area of the body portion, and a seed discharge formed at the lower end of said body portion, said seed discharge including said front wall extending below the lower end of said rear wall this portion of the front wall flaring outwardly and rearwardly upon each side of the longitudinal centre line of said front wall to form a shroud, means within said seed discharge to divide same into a pair of side by side outwardly directed discharge openings, at least one deflector step situated within said body portion on one of said front and rear walls to equalize distribution of seed passing therethrough regardless of the angle of entry of said seed tube attached to said boot and at least one air vent formed through the rear wall of said boot, a pair of vertically spaced apart deflector steps, one on said front wall and one on said rear wall, said one air vent being situated just below said deflector step on said rear wall.

2. The seed boot according to claim 1 in which said one air vent extends transversely across at least part of said rear wall.

3. The seed boot according to claim 2 which includes a rear strut extending perpendicularly from the rear wall of said body portion and inclining downwardly for supporting a banding knife therefrom.

4. The seed boot according to claim 2 which includes trash guard tabs extending perpendicularly from adjacent the lower edge of said rear wall and inclining upwardly and outwardly from the longitudinal centre line of said rear wall.

5. The seed boot according to claim 2 which includes means to vary the pre-determined seed discharge pattern of said seed discharge, said last mention means including a spreader selectively attachable upon the longitudinal centre line of the lower end of said front wall, said spreader including a pair of downwardly and outwardly diverging side walls which defines seed discharge channels with said front wall and said rearwardly flaring portion thereof.

6. The seed boot according to claim 1 which includes a rear strut extending perpendicularly from the rear wall of said body portion and inclining downwardly for supporting a banding knife therefrom.

7. The seed boot according to claim 6 which includes trash guard tabs extending perpendicularly from adjacent the lower edge of said rear wall and inclining upwardly and outwardly from the longitudinal centre line of said rear wall.

8. The seed boot according to claim 6 which includes means to vary the pre-determined seed discharge pattern of said seed discharge, said last mention means including a spreader selectively attachable upon the longitudinal centre line of the lower end of said front wall, said spreader including a pair of downwardly and outwardly diverging side walls which defines seed discharge channels with said front wall and said rearwardly flaring portion thereof.

9. The seed boot according to claim 8 which includes at least two spreaders, a relatively wide spreader and a relatively narrow spreader, means selectively attaching one of said spreaders to said front wall, said means including a raised projection upon each side of the lower end of said front wall, the base of each of said spreader being substantially the same width and engaging between said raised projections, and bolt means extending through said spreader and through said front wall to secure said spreader thereto.

10. The seed boot according to claim 1 which includes trash guard tabs extending perpendicularly from adjacent the lower edge of said rear wall and inclining upwardly and outwardly from the longitudinal centre line of said rear wall.

11. The seed boot according to claim 10 which includes means to vary the pre-determined seed discharge pattern of said seed discharge, said last mention means including a spreader selectively attachable upon the longitudinal centre line of the lower end of said front wall, said spreader including a pair of downwardly and outwardly diverging side walls which defines seed discharge channels with said front wall and said rearwardly flaring portion thereof.

12. The seed boot according to claim 11 which includes at least two spreaders, a relatively wide spreader and a relatively narrow spreader, means selectively attaching one of said spreaders to said front wall, said means including a raised projection upon each side of the lower end of said front wall, the base of each of said spreader being substantially the same width and engaging between said raised projections, and bolt means extending through said spreader and through said front wall to secure said spreader thereto.

13. The seed boot according to claim 1 in which said means within said seed discharge to divide same into a pair of side by side discharge openings includes at least one fore and aft divider bridge extending between said front wall and said rear wall, adjacent the lower edge of said rear wall and upon the longitudinal centre line of said body portion thereby defining, with said body portion, a discharge opening upon each side of said divider bridge.

14. The seed boot according to claim 13 which includes means to vary the pre-determined seed discharge pattern of said seed discharge, said last mention means including a spreader selectively attachable upon the longitudinal center line of the lower end of said front wall, said spreader including a pair of downwardly and outwardly diverging side walls which defines seed discharge channels with said front wall and said rearwardly flaring portion thereof.

15. The seed boot according to claim 14 which includes at least two spreaders, a relatively wide spreader and a relatively narrow spreader, means selectively attaching one of said spreaders to said front wall, said means including a raised projection upon each side of the lower end of said front wall, the base of each of said spreader being substantially the same width and engaging between said raised projections, and bolt means extending through said spreader and through said front wall to secure said spreader thereto.

16. The seed boot according to claim 1 which includes means to vary the pre-determined seed discharge pattern of said seed discharge, said last mention means including a spreader selectively attachable upon the longitudinal centre line of the lower end of said front wall, said spreader including a pair of downwardly and outwardly diverging side walls which defines seed discharge channels with said front wall and said rearwardly flaring portion thereof.

17. The seed boot according to claim 16 which includes at least two spreaders, relatively wide spreader and a relatively narrow spreader, means selectively attaching one of said spreaders to said front wall, said means including a raised projection upon each side of the lower end of said front wall, the base of each of said spreader being substantially the same width and engaging between said raised projections, and bolt means extending through said spreader and through said front wall to secure said spreader thereto.

18. The seed boot according to claim 17 in which the side walls of said relatively narrow spreader incline upwardly and inwardly from the base thereof substantially at an angle of 10° from the vertical, the side walls of the relatively wide spreader inclining upwardly and outwardly from the base substantially at an angle of 10° from the vertical.

19. The seed boot according to claim 1 which includes means to attach said boot to said shank and shovel assembly, said last mentioned means including a bolt aperture in each of said front and rear walls adjacent the lower end of said rear wall and bolt means extending through said shank and said bolt apertures upon the longitudinal centre lines of said walls and a pair of fore and aft bridge pieces extending between said front and rear wall substantially upon the longitudinal centre lines thereof, one above and one below said bolt apertures, said bridge pieces acting as stiffeners for said bolt means and also as dividers for the seed passing therethrough.

* * * * *